Jan. 7, 1936.    J. L. FERGUSON    2,026,734
APPARATUS FOR PUFFING CEREALS
Original Filed May 24, 1927
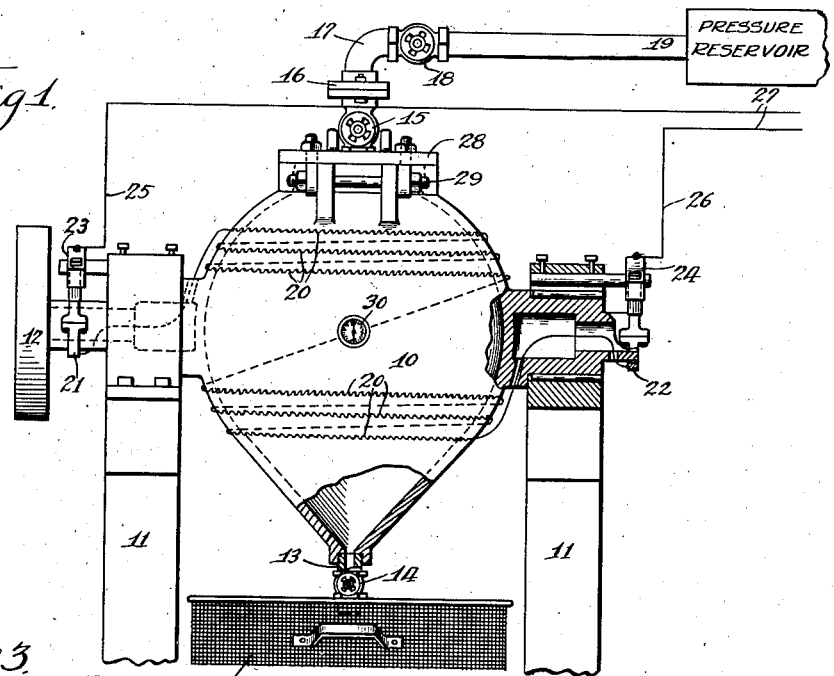
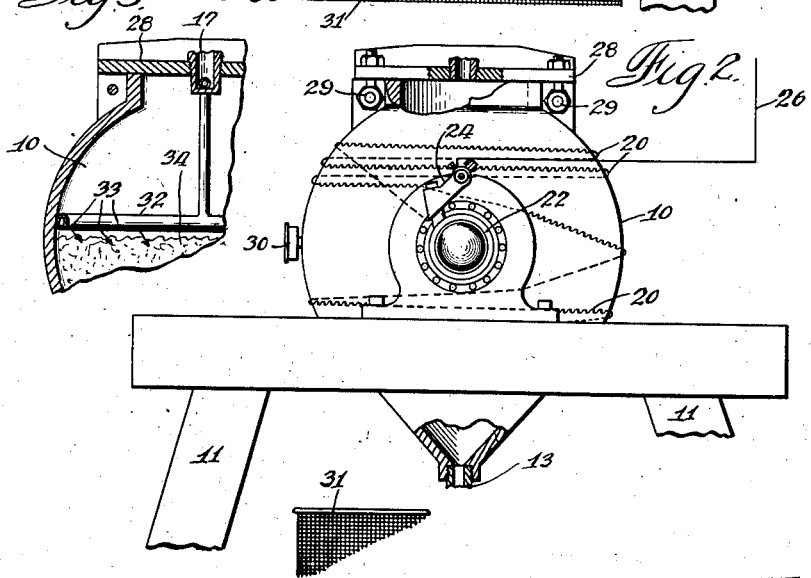
Inventor:
John L. Ferguson
By Jones, Addington, Ames & Seibold
Attys.

Patented Jan. 7, 1936

2,026,734

UNITED STATES PATENT OFFICE 2,026,734

APPARATUS FOR PUFFING CEREALS

John L. Ferguson, Joliet, Ill.

Original application May 24, 1927, Serial No. 193,815. Divided and this application April 22, 1931, Serial No. 531,939

8 Claims. (Cl. 99—2)

My invention relates to a method of puffing cereal grains and an apparatus for practicing the method hereinafter disclosed, the claims pertaining to the method being included in my co-pending application Serial No. 193,815, filed May 24, 1927, and issued as Patent No. 1,839,917, January 5, 1932, of which the present application is a division.

More particularly my invention relates to what may be termed a continuous pressure puffing process. Heretofore grains have been puffed by enclosing the same in a chamber, raising the pressure in said chamber, and suddenly releasing the pressure by opening the enclosed chamber to the atmosphere or some other zone of lower pressure. Such an opening of the chamber functions to violently expel the grains within the chamber and upon their coming into the lower pressure zone they expand to several times their original size, thus forming a very nutritious and satisfactory edible cereal product, while maintaining at the same time, the general form of the original unpuffed grains.

My invention provides a method whereby one of the chief difficulties of the old system is eliminated. In all puffing apparatus with which I am familiar, the grains of cereal vary in size by reason of the fact that when the last grains are expelled from the chamber, the pressure in the latter has fallen so low that the grains do not properly puff or expand. In other words, from the moment of opening the chamber to the lower zone of pressure, there is a sharp decrease in the pressure from that existing before the chamber opened, to that of outside atmosphere. This results in a dwindling of the size of the grain as the pressure falls. My improved process overcomes this shortcoming by arranging to maintain a high pressure within the chamber until the last grains are expelled therefrom, said maintenance of pressure being obtained by introducing additional pressure during the expelling of the grains from the pressure chamber or by otherwise preventing a rapid fall of pressure, for instance, by adjusting the size of the aperture in the chamber so that additional pressure is not required.

While the facts just stated represent a succinct solution of the problems heretofore presented, I did not discover the same without mature experimentation. In other words, the unsatisfactory dwindling of the size of the grains puffed was only a starting point and I have made many experiments in order to determine what was the cause of this difficulty, and I am now able to state that the sharp decrease in pressure is the reason therefor.

For a better understanding of my improved method of puffing as well as an apparatus for practicing said method, reference should be had to the accompanying drawing, in which drawing:

Figure 1 is an elevational view of an apparatus by means of which my invention may be practiced;

Figure 2 is a side elevational view taken at 90° to that shown in Figure 1; and

Figure 3 is a fragmentary elevational view of one portion of the apparatus.

Referring now more particularly to the drawing, a chamber 10 is formed of heavy metal, or equivalent material, sufficiently strong to withstand very high pressures which may be generated therewithin. The chamber 10 is mounted for rotation in standards 11—11 and may be constantly rotated to insure correct treatment of the grains which are placed within the container or chamber 10, such rotation being secured by rotating a pulley 12. Of course a gear wheel and chain may be substituted for said pulley.

The chamber 10 is more or less pear-shaped having an aperture 13 at its lower end which is closed by a very quick opening valve 14, it being understood the same is shown diagrammatically for purposes of illustration only, and may take any desired form so long as the practice of the method hereinafter described and claimed is secured.

The chamber 10 is shown in Figs. 1 and 2 in a position which may be properly designated "firing" position, that is, the position in which the same stands when the grains are expelled from the interior of the chamber. The upper end of the chamber 10 is provided with a closure valve 15 and a disconnecting member 16. By means of the member 16, the upper end of the chamber 10 may be connected through a pipe 17 and a valve 18 to a line 19 which leads to a reservoir of high pressure.

For purposes of illustration only, I have shown a plurality of electrical resistor members 20 wrapped around the outer surface of the member 10, these resistors 20 deriving current from slip-rings 21—22 on which latter bear brushes 23—24 connected to leads 25 and 26 leading to any suitable source or current such, for instance, as 27.

Assume now that a plurality of cereal grains are enclosed within the chamber 10, this being done by lifting an upper cover 28 secured to the upper end of the chamber 10 by hinges 29 (the valve 15 being positioned permanently on said member 28).

The valve 14 is closed against high pressure as is also the valve 15. The elbow connection 17 is disconnected at 16 and swung aside so that the chamber 10 is free to be slowly rotated in the standards 11, which rotation prevents the burning of the grains which are contained within the chamber.

At the same time the current passes through the resistors 20, and heats the surface of the chamber 10 and gradually raises the pressure within said chamber as the heat increases. Suitable indicating instruments, such as a gauge 30, may be placed anywhere upon the chamber 10, wherefrom one will be able to observe the pressure existing within the chamber 10. When this latter reaches a predetermined figure the rotation of the chamber 10 is stopped and the connection 17 made as shown in Fig. 1, and then the valve 14 is opened.

The sudden opening of the chamber to the atmosphere or, if desired, to some other zone of lower pressure, results in the grain being violently expelled through said opening 13 and upon their coming out into the low pressure zone, the expansion of said grains takes place and a puffing thereof results. In practicing the above method I find it desirable that the inlet from the pressure reservoir to the heating chamber or cooker should be of relatively large area to prevent wire drawing of the pressure.

By my improved arrangement, however, the last grains to be expelled from the chamber are, all the time while they remain within the chamber, subjected to a uniform high pressure so that even the last grains expelled are puffed to the same size as those which were first expelled. Such a maintenance of pressure is arranged by opening the valve 15, either before or at the same time, as the valve 14 is opened. The pressure flows from the pressure reservoir through said valve 15 and maintains the pressure in the chamber at a predetermined figure so that there is not the sharp drop in pressure which results in a dwindling of the size of the grains. Thus by the opening of the valves 14 and 15 in proper sequence the desired results are obtained.

In Figure 3 I have illustrated an arrangement which I find to be very helpful in the practice of my improved puffing process. In this figure I show only a fragmentary section of the grain-containing chamber, but it is to be understood that a pipe 32 encircles the interior of the chamber and is connected to the valve 15 and pipe 17 so that the pressure derived from the pressure reservoir is distributed from said pipe 32 through a number of very small apertures 33. Although the apertures 33 are so small that no grain may get therein during the rotation of the chamber 10, the total area of said apertures is much in excess of the area of the aperture 13, for the reasons heretofore explained.

By so arranging the pipe 32 just above the normal grain line 34, I am enabled to assert a uniform pressure over a considerable area, thereby preventing the possibility of the pressure blowing through from the upper opening to the lower opening and as it were "boring a hole" in the grain to be puffed and nullifying the effect of maintaining the pressure in the upper part of the chamber 10.

Moreover, the provison of orifices 33 around the interior circumference of the chamber 10 produces a very desirable cleansing effect on the interior of the chamber and helps gravity feed the grains downwardly to the outlet.

As I have above intimated, the desirable maintenance of pressure in the chamber until all the grains pass through the lower aperture may also be secured without the introduction of pressure. I find that the provision of a chamber in which the outlet orifice is at the lower portion thereof when in "firing" position, and of such shape, or otherwise so manipulated, that the grain stands in the bottom thereof and over the exit opening prior to "firing" is of extreme advantage. The grains form a solid mass in the bottom portion of the chamber, and therefore, when the valve 14 is open the pressure cannot escape through the mass of grains which are gravity propelled toward the orifice 13. Only a very small drop in pressure at a low rate of decrease is noticed with any close packing of the grains. In other words, the pressure is maintained within the chamber because the grains become clogged in the lower orifice and prevent the blowing out of the high pressure. As the pressure impels the grains outwardly, they are carried uniformly down and through the aperture 13 to be expanded or puffed as they reach the outer lower zone of pressure.

I therefore regard the provision of means for practicing my method whereby the grains are gravity fed toward the outlet aperture of extreme importance and one of the desirable features of my invention.

Of course any other desired heating means than those shown may be used, for instance gas, but I have illustrated the electric resistor method as one which may be conveniently utilized. The grains as they emerge from the opening 13 are preferably directed into a large cage, or other similar compartment 31, and are collected therefrom for disposal.

While I have heretofore described an apparatus in which the desirable pressure maintenance during the expulsion and puffing of the grains is accomplished by the actual addition of a medium under pressure to the interior of the heating chamber as the grains are passing therefrom, it will of course be understood that this is but one example of means for maintaining the pressure as heretofore described and that other desirable means for maintaining the pressure therein may be utilized without departing from the spirit of the present invention, for instance the heating element shown may be used in this connection for raising the heat applied to the chamber as the grains pass therefrom, such raising of the temperature so increasing the pressure within the chamber that the same desirable pressure maintenance is obtained as has been previously described, or the metallic chamber or enclosing mass may be of such heat absorbent and emitting capacity that residual or stored-up heat is constantly supplied to the interior of the chamber to maintain the pressure therein as the grains are expelled.

While I have described but one apparatus for practicing my improved method of puffing, it is obvious that those skilled in the art may adapt the same in many different ways without departing from the spirit and scope of the appended claims or of my process, and I desire, therefore, that the invention be limited only by the scope of the appended claims and the showing of the prior art.

I claim:

1. In an apparatus for puffing grains, an enclosed chamber, means for raising the pressure in said chamber, means for suddenly opening said chamber whereby the grains under pressure in said chamber are expelled therefrom and are thereby puffed, and means for insuring the existence of substantially the same pressure differential on the last grains expelled from said chamber as on the first grains expelled therefrom.

2. In an apparatus for puffing grains, an enclosed chamber, means for raising the pressure in said chamber, means for suddenly opening said chamber whereby the grains under pressure in said chamber are expelled therefrom and are thereby puffed, and means connecting said chamber to a source of pressure during the time the said chamber is open and maintaining the same pressure differential on the last grains expelled from said chamber as on the first grains expelled therefrom.

3. In an apparatus for puffing grains, an enclosed chamber, means for raising the pressure in said chamber, means for suddenly opening said chamber whereby the grains under pressure in said chamber are expelled therefrom and are thereby puffed, and means for simultaneously connecting said chamber to a source of pressure when said chamber is opened thereby for insuring the existence of substantially the same pressure differential on the last grains expelled from said chamber as on the first grains expelled therefrom.

4. In an apparatus for puffing grains, an enclosed chamber, means for raising the pressure in said chamber, means for suddenly opening said chamber whereby the grains under pressure in said chamber are expelled therefrom and are thereby puffed, a pressure reservoir capable of supplying throughout the period of expulsion of said grains from said chamber a pressure at least as high as the pressure in said chamber just prior to the opening thereof, and means for connecting said chamber to said reservoir when the chamber is open and the grains are being expelled to insure the existence of substantially the same pressure differential on the last grains expelled from said chamber as on the first grains expelled therefrom.

5. In an apparatus for puffing grains, an enclosed chamber having an exit opening therein, means for raising the pressure within said chamber thereby to prepare said grains for expulsion into a zone of the lower pressure to puff the same, said chamber having walls converging towards the opening through which said grains are expelled to form a dam restricting the flow of grain through said opening to retain substantially the same pressure differential on the last grains expelled from said chamber as on the first grains expelled therefrom, whereby the grains themselves prevent substantially the reduction of the interior pressure.

6. In an apparatus for puffing grains, an enclosed chamber having an opening therein through which grains are expelled, means for raising the pressure within said chamber thereby to prepare said grains for expulsion into a zone of the lower pressure to puff the same, and pressure maintenance means through which the pressure in the interior of said chamber may be maintained at a desirable figure during the expulsion of said grains, said pressure maintenance means comprising structure comprehending a plurality of openings, each of which is small enough to prevent the clogging thereof by the grains, but the combined area of which is greater than the opening through which said grains are expelled.

7. In an apparatus for puffing grains, an enclosed chamber, means for raising the pressure within said chamber thereby to prepare said grains for expulsion into a zone of the lower pressure to puff the same, said chamber being so shaped that the grains being expelled function to maintain the high pressure within said chamber as said grains are expelled therefrom, and means including heating elements for maintaining substantially the same pressure differential on the last grains expelled from said chamber as on the first grains expelled therefrom.

8. In an apparatus for puffing grains, an enclosed chamber, means for raising the pressure within said chamber thereby to prepare said grains for expulsion into a zone of the lower pressure to puff the same, said means applying heat to said chamber to increase the pressure therein, and means permitting the movement of said chamber to prevent the scorching of the grains therewithin, said chamber being provided with an opening toward which latter the walls of said chamber converge, and said movement-permitting means being such as to permit the said chamber to be brought into position during the expulsion of said grains so that the said grains are gravity-actuated toward the opening at the apex of said converging portion to block the opening during grain expulsion and thereby maintain substantially the same pressure differential on the last grains expelled from said chamber as on the first grains expelled therefrom.

JOHN L. FERGUSON.